United States Patent Office 3,676,220
Patented July 11, 1972

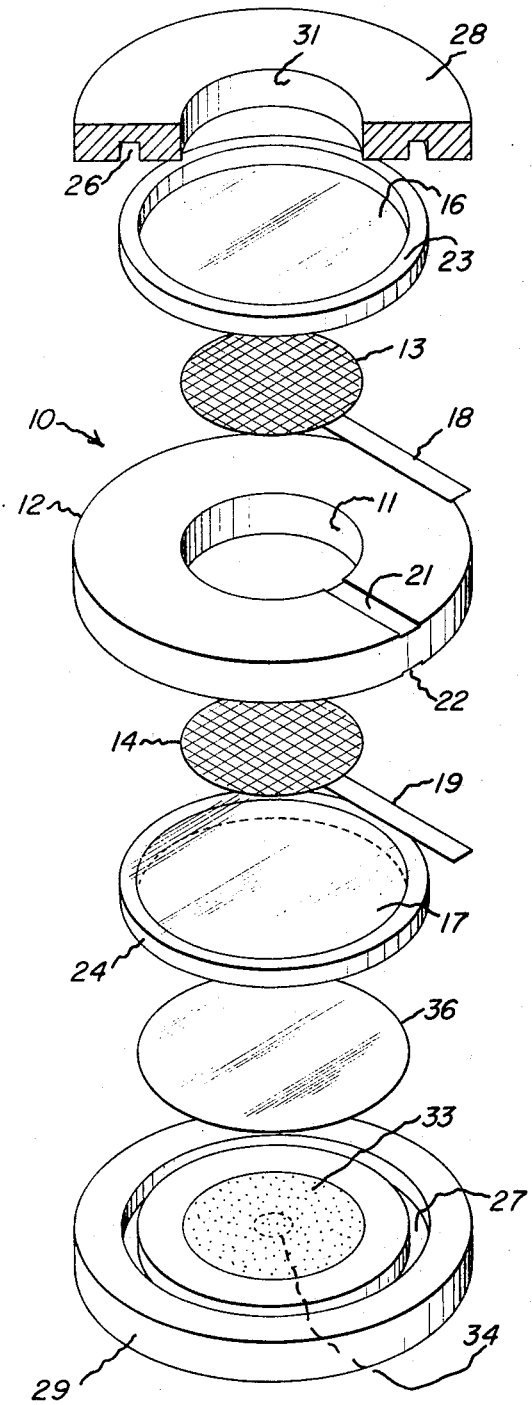
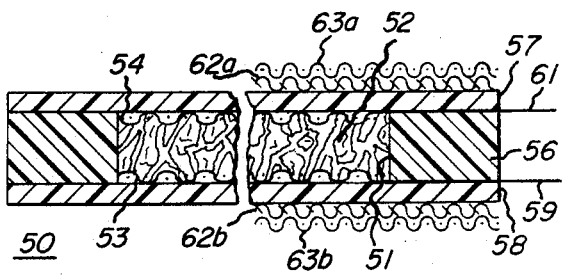

3,676,220
FACILITATED TRANSPORT LIQUID MEMBRANE
William J. Ward III, Schenectady, N.Y., assignor to General Electric Company
Filed Feb. 27, 1969, Ser. No. 803,019
Int. Cl. H01m 27/02; B01d 57/00; C01b 21/36
U.S. Cl. 136—86
9 Claims

ABSTRACT OF THE DISCLOSURE

A confined liquid membrane having an electrode in contact with each surface thereof is provided with a concentration of a non-volatile transporting specie in solution therein, which transporting specie can be oxidized or reduced from a first to a second valence state. The transporting specie must be reactive with a specific gas in at least one of the multiple valence states. If the transporting specie is reactive with the gas in both valence states, such reactions must have different equilibrium constants. By bringing the specific gas into contact with one surface of such a liquid membrane and applying an electrical potential across the electrodes on each side thereof, the specific gas may be pumped through the membrane against a concentration gradient. Similarly, while a concentration gradient in the specific gas exists across the structure described, an electrical potential difference develops across the film and the electrodes.

BACKGROUND OF THE INVENTION

This invention is an extension of the application of the phenomenon of facilitated transport to liquid membranes. The phenomenon of facilitated transport is believed to occur in biological systems and has been simulated in biophysical investigations. Also, this phenomenon has been applied to the separation of gases by differential permeation through liquid, or quasi-liquid, films behaving substantially as polymeric films. This application of facilitated transport has been disclosed in U.S. Pat. 3,396,510, Ward et al. (incorporated herein by reference) wherein transporting species for the facilitated transport separation of carbon dioxide, sulfur dioxide and oxygen gases are described.

The term "quasi-liquid film" refers to a film of immobilized liquid such as may be prepared by swelling a polymer film with the liquid proposed for effecting the separation, with the swelling being effected to the extent that the liquid itself becomes the controlling resistance to the permeation.

The use of liquid (interpreted herein as including quasi-liquid) membranes for gas separation has been disclosed in U.S. Pat. 3,335,545, Robb et al. incorporated herein by reference. As is disclosed in the Robb et al. patent, the conventionally recognized thin solid polymer barrier well-known in the art for the separation of gases through the phenomenon of selective permeation can be replaced by a liquid film resulting in a considerable increase in the degree of separation of certain gases.

Much greater increases in the separation factors may be obtained with liquid films employing facilitated transport as is described in the aforementioned Ward et al. patent. According to the description of the phenomenon of facilitated transport set forth therein, assuming a chemical reaction wherein A reacts with B according to the reaction $A + B \rightleftharpoons AB$, if it is assumed A is a gas and B and AB are non-volatile molecular, or ionic, species present in a liquid film, when a difference in the concentration of A is maintained across the film (by maintaining a difference in partial pressure of A at the opposite faces of the film), there is established a difference in the concentration of AB, which is in the same direction (increasing or decreasing) as the A concentration difference. Also, a concentration difference in B is established, which increases or decreases in the opposite direction from the A concentration difference. Stated in another way, in proceeding from a first face of a liquid film to the opposite face thereof, if the concentration of A is decreasing with distance across the film, the concentration of B is increasing and the concentration of AB is decreasing. As the result of these differences in concentrations, there is a transport of species A and AB in the same direction across the film, and a transport of B, which is equal in magnitude, but opposite in direction to the transport of AB. The total amount of A which passes across the film is the sum of the rates of flow of A and AB across the film. By this analysis it may be seen that a shuttle mechanism for A is established in the film in this manner whereby by diffusion of AB and by the continuous unloading of A from AB at the side of the film, where the low partial pressure of A exists, the transport of A is facilitated.

In conducting detailed mathematical and experimental investigations of facilitated transport in a model system consisting of nitric oxide and ferrous chloride, it was found that nitric oxide transport across a liquid film containing $Fe^{2+}$ and $Fe^{3+}$ ions can be electrically induced. This novel mechanism using the appropriate transport specie may be applied to electrically pump a given gas against a concentration gradient and by employing the inverse of this effect; namely, the capability for generating an electrical potential difference across a liquid membrane when a particular transporting specie is present is applicable to gas sensor construction, which will produce an electrical output proportional to the concentration (partial pressure) of the specific gas being detected as the specific gas enters the membrane and reacts with at least one valence state of the transport specie.

SUMMARY OF THE INVENTION

A thin confined layer of liquid contains a concentration of non-volatile transporting specie in solution, the transporting specie being characterized by being capable of being oxidized or reduced from a first to a second valence state and being reactive with a specific gas in at least one of the multiple valence states. Electrodes in contact with the liquid membrane at opposite surfaces thereof serve to provide electrical contact between the liquid film surfaces and either (a) an exterior voltage source or (b) means for utilizing an electrical potential induced across the film. Some means is provided for maintaining the electrodes in spaced relationship. This construction is disposed in use in such a manner that a given gas or a gas mixture may be brought into contact with one side of the composite membrane/electrode construction and the opposite side thereof is in communication with some volume to which the given gas or gas mixture does not have access other than through the liquid membrane.

BRIEF DESCRIPTION OF THE DRAWING

The exact nature of this invention as well as objects and advantages thereof will be readily apparent from consideration of the following specification relating to the annexed drawing in which:

FIG. 2 is an exploded sectional view through a composite membrane/electrode construction for demonstrating the instant invention;

FIG. 4 is a cross-sectional view of a preferred composite construction according to this invention.

DESCRIPTION OF THE PREFERRED EMBODIMENT

In accordance with this invention a system for electrically induced carrier transport of a gas through a liquid membrane (or for the generation of an electrical signal induced by a partial pressure difference across such a membrane) is broadly defined as a liquid film bounded by electrode structures, which film contains a concentration of at least one ion reflecting a positive oxidation state of a soluble metal ion.

Assuming the presence of concentrations of two ions reflecting different positive oxidation states, these ions may be represented by the symbols $M^{t+}$ and $M^{n+}$. Some specific gas A must be reversibly reactive with the soluble metal ion $M^{t+}$ and may, or may not, react with the second oxidation state ion, $M^{n+}$. However, the value of the equilibrium constant for the reaction of gas A with ion $M^{t+}$ must at least be greater than the equilibrium constant for the reaction of gas A with ion $M^{n+}$. The aforementioned possible reactions may be represented as follows:

(1) $\quad A + M^{t+} \rightleftarrows (MA)^{t+}$ (2) $\quad A + M^{n+} \rightleftarrows (MA)^{n+}$ Considering the simplest arrangement of the assumed situation (gas A is totally unreactive with any oxidation state of the soluble metal ion M except the ions $M^{t+}$), if the electrodes bounding the liquid film containing $M^{n+}$ and $M^{t+}$ ions are connected to an external D.C. power supply and current is passed through the liquid film, the reaction at the film cathode would be as follows (assuming that $n$ is greater than $t$):

(3) $\quad M^{n+} + (n-t)e^- \rightarrow M^{t+}$

Similarly, the reaction at the film anode would be as follows:

(4) $\quad M^{t+} \rightarrow M^{n+} + (n-t)e^-$

Figure 1:
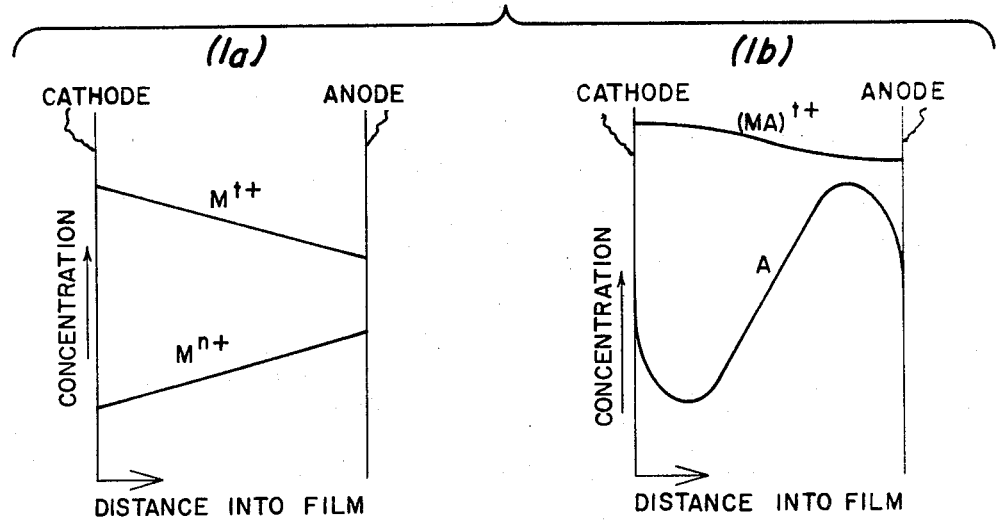
FIG. 1 displays concentration profiles established in a liquid film after the application of electrical current and illustrates the theory of this invention.

The concentration profiles in $M^{t+}$ and $M^{n+}$, which are established in the liquid film under the above-noted conditions, are shown in FIG. 1a. Under the application of electrical power the concentration of $M^{t+}$ ions is greater at the cathode than at the anode, while in the case of the $M^{n+}$ ions the reverse situation occurs. Since the concentration of $M^{t+}$ ions and $MA^{n+}$ ions varies with distance into the film, Reaction 1 will be driven to the right or to the left or be in equilibrium at different locations in the film. For example, at the anode there is a deficiency in $M^{t+}$ ions and Reaction 1 is driven to the left. The net results are the concentration profiles for A and $(MA)^{t+}$ shown in FIG. 1b, in the shape of a letter S. Because the slope of the tangent to the curve (representing concentration gradients) at each boundary of the film is negative, gas A will enter at the cathode face and will exit at the anode face of the liquid film providing a net transport of A across the film from left to right. In the central region of the film the concentration gradient in A is positive (positive slope) but the movement of gas A to the left is more than offset by the negative concentration gradient of $(MA)^{t+}$ in this same region resulting in a net movement of the gas A to the right. If gas A were reactive with the higher oxidation state $(M^{n+})$, rather than the lower oxidation state $M^{t+}$, the net transport would be in the opposite direction, that is from anode to cathode.

In operation the gas-containing complex ion [e.g. $(MA)^{t+}$] should carry at least about 1% of the total current passing through the liquid film, which may be aqueous or an organic liquid, preferably of low volatility. Preferably the concentrations of the multiple valence states in solution in the liquid film should be about the same. Variations from this condition may be tolerated as long as the concentrations of multiple valence states present are at least of the same order of magnitude. Confining members for the liquid film, where required, may constitute semi-permeable membranes or may be porous walls not wet by the film liquid in which the average pore size is of the order of 1 micron. The liquid film may be in the form of a gel without diminishment of the transport facility and in such case it may not be necessary to employ an upper confining member. Any porous matrix employed to house the liquid comprising the film in its interstices (and simultaneously space the electrodes) should be made of electrically insulated material so as not to electrically short circuit the electrodes.

This transport phenomenon has been investigated in the film holder apparatus 10 illustrated in FIG. 2 with a model system consisting of nitric oxide (gas A) together with ferrous chloride to supply the soluble metal ion $(M^{t+})$ with which nitric oxide is reactive. A liquid film of formamide was contained within cylindrical well 11 formed in electrically insulated disc 12 and bounded by 150 mesh platinum gauze disc electrodes 13 and 14. The platinum electrodes were woven from 1.5 mil wire and were made in a diameter slightly smaller than that of well 11. Electrode 13 was attached at a number of points around its perimeter to the underside of 1 mil thick non-porous silicone rubber membrane 16 and electrode 14 was similarly attached to the upper surface of 1 mil thick non-porous silicone rubber membrane 17. Electrical contact was made to electrodes 13 and 14 via ⅛ inch x 3 mil platinum ribbon contacts 18 and 19, respectively, which lead from electrodes 13, 14 to the outside of film holder 10 along slots 21, 22, respectively, cut into the opposite surfaces of disc 12. Disc 12, which was initially electrically conducting, was insulated by the application of 1 mil film electrical insulation coating thereover. This disc 12 could, of course, have been made initially of an electrically non-conducting material, such as plastic. The slots 21 and 22 were hermetically sealed with silicone rubber disposed between leads 18 and 19 and the surfaces of the slots.

Silicone rubber films 16 and 17 were stretched over and bonded to rings 23 and 24, respectively. In assembling the device rings 23 and 24 fit into recesses 26, 27 located in top and bottom plates 28, 29, respectively. Communication with the upper face of membrane 16 through top plate 28 is via hole 31. The test apparatus 10 was designed to permit the application of very large pressure differences across the liquid layer in well 11 and for this reason porous support means was necessary on the low pressure side of membrane 17. Porous stainless steel disc 33 is such a support means in communication with both hole 34 in plate 29 and with membrane 17.

Since silicone rubber is swelled by formamide, in those studies in which a pressure differential was applied across the liquid film, it was necessary to supply a 3-mil thick film of porous polyethylene 36 between the silicone rubber membrane 17 and the supporting porous stainless steel disc 32 on the low pressure side. The pores of the polyethylene were of the order of hundreds of angstroms in diameter and, since formamide does not wet polyethylene, the formamide would not pass through these pores because of the surface tension of the formamide itself. In the absence of significant pressure differential film 36 and porous disc 33 could be eliminated.

The resistance to nitric oxide transport of silicone rubber films and the polyethylene film was neglected since it was less than 1 percent of the resistance of the formamide film. Since in the application of this invention there need not be any significant pressure differential across the film, liquids having a higher vapor pressure than formamide, for example water, may be employed as the solvent (liquid film). The reason for using formamide in the verifying studies conducted was that, because of its low vapor pressure and high dielectric constant this liquid would assure reasonably complete ion dissociation in dilute solutions and permit establishment of controlled experimental operating conditions, which included the imposition of a vacuum.

Before assembling the cell, the upper and lower surfaces of disc 12 were sprayed with a non-wetting agent (a fluorocarbon spray) so that the formamide would not seep out of well 11 in which it was contained. Care was taken not to spray the inside wall of well 11 with the non-wetting material.

In loading the cell 10, components 29, 36, 17 (supported on 24) 14 and 12 were bolted together; well 11 was filled with degassed formamide containing 0.25 M $FeCl_2$ and 0.25 M $FeCl_3$; the rest of the components 13, 16 (supported on ring 23) and 28 were assembled; and the entire assembly was bolted together (bolts not shown) to provide a liquid film 0.1 cm. in thickness.

By carefully loading and assembling the cell the entrapment of air between the silicone rubber films can, and should, be avoided.

A 1½ volt battery (not shown) was used as the D.C. power supply and the voltage was impressed across the liquid film being controlled by a ten turn variable resistor (not shown). The voltage across the film was measured with a high impedance vacuum tube voltmeter (not shown).

The composite film was mounted so that each side of the cell was in communication with separate vacuum systems in order to evacuate and degas both sides of film holder 10. After degassing, both sides of the liquid film were exposed to a pressure of 50 millimeters of mercury of nitric oxide gas. When the film had eqilibrated with the nitric oxide, a constant current was applied to the film. Following an initial period of change, when the current was first applied, the system operated at steady state. The pressure on both sides of the film was not allowed to deviate significantly from 50 millimeters of mercury.

In all of the studies made the concentrations of $Fe^{2+}$ and $Fe^{3+}$ were each initially 0.25 mole/liter. The anion present was chloride. In all runs a pressure of 50 millimeters of nitric oxide was used on both sides of the film. The applied voltage was changed to maintain a constant current until steady state conditions were reached.

The steady state flux of nitric oxide across the liquid film was measured as a function of the current passing through the film. It was found that the moles per second of nitric oxide traversing the liquid film per unit area varied approximately linearly with the current applied. In addition to the flux of nitric oxide across the film of $Fe^{2+}$, $Fe^{3+}$ solution there is a net flux of $Fe^{3+}$ ions from the anode to the cathode and counter thereto is a balancing flux of $Fe^{2+}+FeNO^{2+}$ from cathode to anode. The total flux of NO (which remains a constant throughout the film) may be expressed as the sum of the permeating nitric oxide plus the nitric oxide in the complex ion, $FeNO^{2+}$ $$F_{NO}^T = F_{NO} + F_{FeNO^{2+}}$$

wherein F is customarily expressed in moles/sec., cm.²

Figure 3:
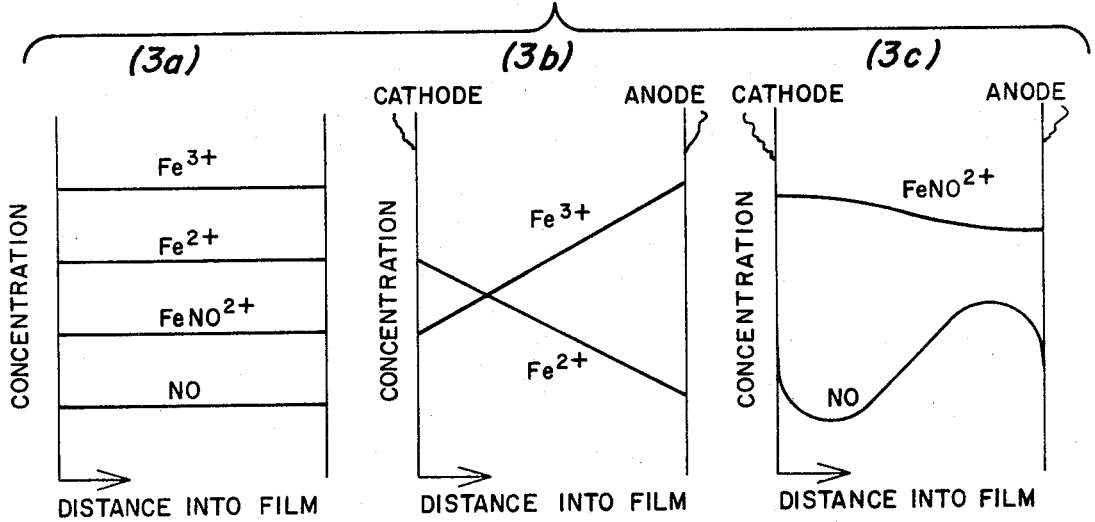
FIG. 3 sets forth concentration gradients established by experiment in a nitric oxide/ferrous chloride system.

The concentration profiles in the nitric oxide transport system, which are established in the liquid film containing $Fe^{2+}$ and $Fe^{3+}$ ions are shown in FIG. 3. As is shown in FIG. 3a, prior to the application of current the concentration of each ion is uniform across the thickness of the film (the relative vertical positioning of the several film components being of no significance). FIGS. 3b and 3c represent the concentration gradients in the liquid film resulting from the application of current. Similar concentration gradients would develop in the system by connecting the electrodes to an exterior load and applying a difference in nitric oxide partial pressure across the film.

In the nitric oxide system described hereinabove, nitric oxide reacts reversibly with $Fe^{2+}$ according to the reaction:

(5) $\qquad Fe^{2+} + NO \rightleftharpoons FeNO^{2+}$

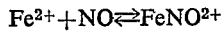

The nitric oxide and $Fe^{3+}$ ions are non-reactive with each other and so, when the electrodes are connected to an external D.C. power supply and current is passed through the film, the electrochemical reaction at the cathode is:

(6) $\qquad Fe^{3+} + e^- \rightarrow Fe^{2+}$

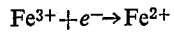

while at the anode the reaction is:

(7) $\qquad Fe^{2+} \rightarrow Fe^{3+} + e^-$

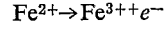

After a steady state condition has been achieved (with substantially equal pressure of nitric oxide on each side of the liquid film) the concentration profiles in $Fe^{2+}$ and $Fe^{3+}$ established in the film are as shown in FIG. 3b. There now exists an excess of $Fe^{2+}$ ions at the cathode causing Reaction 5 to be driven to the right (production of $FeNO^{2+}$ ions). Conversely, at the anode there is a deficiency in $Fe^{2+}$ ions and Reaction 5 is driven to the left (breakdown of $FeNO^{2+}$ ions). Variations of these sets of conditions occur at various locations through the film and as a result, the concentration profile in nitric oxide established within the film assumes the S shape sown in FIG. 3c (similar to the concentration profile for gas A in FIG. 1c). The resultant $FeNO^{2+}$ concentration profile is also shown in FIG. 3c.

When current is passed through the film, NO is transported across the film. The flux of NO is approximately 6% of the current flux, which means that 6% of the current is carried within the film by $FeNO^{2+}$ ions. Thus, it has been demonstrated that it is possible to electrically "pump" a gaseous material through a liquid membrane across which no favorable pressure difference exists. This invention also has the capability of moving a gas from lower to higher partial pressure conditions.

Other applications of this concept are as follows. In a system such as that described above, if a pressure difference in the reacting gas is maintained across the liquid film, an electrical potential is developed, which could serve as a source of power. Such a liquid membrane could be used as a gas detector. For example in the nitric oxide system, if one side of the liquid film transport system described were completely free of NO, then a small partial pressure of NO on the other side of the film would result in a measurable electrical potential.

Another example of the gas transport system of this invention is the system consisting of CO, $Cu^+$, $CuCO^+$, $Cu^{2+}$. In this case the liquid film would contain $Cu^+$ and $Cu^{2+}$ and since CO reacts reversibly with $Cu^+$, but not with $Cu^{2+}$, CO could be transported electrically across the film in the direction from cathode to anode. A suitable solvent would be water, formamide, or some other liquid with a high dielectric constant. A limitation of this particular system is the fact that $Cu^+$ is unstable in the presence of oxygen.

Another type of system in which electrically induced carrier transport will occur consists of a gas, a liquid film containing metal ions $M^{t+}$ with which the gas reacts reversibly, and perforate electrodes made of the metal M. An example of such a system is ethylene, $Ag^+$ dissolved in water or some other suitable solvent (as, for example by adding $AgNO_3$ thereto), and silver gauze electrodes. The transport of the ethylene gas will occur until the anode is consumed, if carried far enough, with $Ag^+$ leaving the anode and plating out at the cathode. In practice, the liquid film and, consequently the current direction, would be reversed periodically so that no one electrode is completely consumed. $Ag^+$ combines with a very large number of gaseous ligands (L) such as ammonia, chlorine, bromine, simple olefins, and many aromatics to form complex ions $(AgL)^+$ and for all of these systems electrically induced carrier transport may be effected. Another example of this type of system consists of ammonia, a film containing $Ni^{2+}$, and nickel electrodes. In this case electrically induced ammonia transport will occur from anode to cathode.

The second type of transport system (employing consumable electrodes) differs from the first type of transport system only as follows:

(a) In Type I, two positive oxidation states of a metal represented by positive metal ions are present in the liquid film; while
(b) In Type II, a positive and a zero oxidation state of a metal occur (the positive metal ions in solution and the consumable electrode metal itself).

Otherwise the transport system is the same in both Types I and II in that spaced perforate electrodes are in contact with opposite faces of a liquid film and some non-volatile transporting specie is dissolved in the liquid film. This transporting specie must be one which can be oxidized, or reduced, to a non-reacting valence state and is reversibly reactive with a specific gas. The complex gas-containing ion must also be non-volatile.

In the Type II transport system, when a D.C. potential is applied across the liquid film containing the positive metal ion, the concentration profile of the metal ion in the film is upset so that there is an excess of metal ions at the anode, because metal from the anode is going into solution, and a depletion of metal ions at the cathode, where metal ions are being deposited at the same rate. The gaseous ligand reacts with the metal ion at the anode, the resulting complex ion passes through the film and the gaseous ligand separates from the metal ion to leave the film at the cathode. By reversing the liquid film (and thereby reversing the current direction) ligand gas can still be pumped in the original direction and the consumed and plate-out electrodes are reversed.

FIG. 4 is a sectional view through a composite structure 50 for the practice of this invention. The liquid film chamber 51 will preferably contain a layer of porous material 52 (such as finely woven cloth or paper, for example) impregnated with the liquid film, although chamber 51 may contain only the liquid film, if other means are provided for holding the electrodes 53, 54 in predetermined spaced relation. For example, if the diameter of the liquid film is relatively small, seal 56 may suffice as the spacing means with electrodes 53, 54 being affixed to the underside of upper and lower confining membranes 57, 58, respectively. Membranes 57, 58 may be of thin non-porous, permselective membrane materials or may be non-wetting porous membranes (non-wetting to the liquid film material).

In preparation of the structure membrane 58, electrode 53, layer 52 (soaked or dry depending on the capability for later impregnation with the membrane liquid), electrode 54 and membrane 57 may be stacked and sealed (seal 56) around the entire periphery. Seal 56 may be made of the room temperature vulcanizing form of silicone rubber, for example. The spacing between electrodes 53, 54 should be at least about 10 mils although larger spacings may be employed. Forty mil spacings have been successfully employed in testing, for example. Leads 59, 61 connect to electrodes 53, 54, respectively and provide for the application of D.C. electric power thereto.

The option is available for preparing structure 50 without including the liquid membrane material therein. In such case the liquid for the membrane containing the transporting positive metal ion specie (together with a second positive metal ion, if a Type I membrane is desired) can be introduced into the completed membrane structure, when desired, by means of a hypodermic needle, for example, which can be inserted through the side wall (seal 56) for the filling operation. A particular plug of self-sealing elastomer may form part of side wall 56 to insure retention of the liquid solution within chamber 51. Also, if desired, a permanent valved connection may be supplied for periodic renewal of the liquid as required to the interior of chamber 51.

A preferred material for one or both membranes 57, 58 is the ultra-fine porous polymer membrane disclosed in U.S. patent application S.N. 717,893, Weininger et al., filed Apr. 1, 1968, now abandoned, and assigned to the assignee of the instant application. This porous material may be used in combination with any liquid film (such as an aqueous solution, which does not wet the porous membrane material. The disclosure of the aforementioned patent application is incorporated herein by reference in its entirety. A similar porous material for membranes 57, 58 is disclosed in U.S. Pat. No. 3,378,507, Sargent et al. in which is described a solid material containing a mixture of monoethylenically unsaturated hydrocarbon polymer and a water-soluble, anionic surfactant, the surfactant being present as a separate, continuous phase, which can be dissolved out to leave a unitary, microporous polymer solid. Other suitable porous materials for layer 52 are disclosed in U.S. Pats. Nos. 2,984,869, Honey et al.; 3,351,459, Larson et al.; 3,216,881, Feldt et al. and U.S. 3,062,760, Dermody et al.

Protection for faces 57, 58 may be afforded, if required, by open mesh cloths, or mats, 62a, 62b alone or in combination with supporting screens 63a, 63b. The cloth backing may be of cotton or synthetic fiber, while the screen may have a mesh size (U.S. Sieve) ranging from about 10–50. If a metal screen is used, provisions should be made to electrically insulate leads 59, 61 from these screens.

Data on the permselective properties of many solid plastic membranes potentially useful for membranes 57, 58 and methods for preparation thereof have been disclosed in numerous patents and articles in the literature (for example, "Gas Permeability of Plastics" by Major et al., July 22, 1962 issue of Modern Plastics, page 135 et seq.; U.S. 3,256,675, Robb; U.S. 3,274,750, Robb and U.S. 3,325,330, Robb).

It, therefore, should be an obvious extension of the teachings set forth herein to select from the many possible combinations of materials available and construct variations of the structure disclosed herein for the electrical facilitation of gas transport through an enclosed liquid membrane. As one variation in the preparation of these structures, the elements 52, 53, 54, 57 and 58 may be made in substantially the same shape and size and stacked in a package, after which each edge of the package in turn would be dipped in a suitable sealing compound, as for example a curable siloxane potting compound. The depth to which the edges would be dipped should be sufficient to effectively secure the elements together and preferably form a leakproof seal. Also, although a flat membrane construction has been described herein, tubular construction is contemplated as well.

What I claim as new and desire to secure by Letters Patent of the United States is:

1. A composite structure for the containment of a liquid membrane through which either the preferential transport of a preselected gas may be electrically induced or the passage of said preselected gas will generate an electric signal, said composite structure comprising in combination:

(a) a first thin, perforated sheet-like electrode,
(b) a first gas-permeable membrane contiguous with said first electrode over one major face thereof,
(c) a second thin, perforated sheet-like electrode,
(d) a second gas-permeable membrane contiguous with said second electrode over one major face thereof,
(e) said electrodes and membranes being disposed in stacked arrangement having said first and second membranes at the top and bottom thereof, respectively, and said electrodes being spaced apart a predetermined distance,
(f) means extending around the perimeter of said stacked arrangement for joining together the edges of said membranes to define an enclosed, sealed volume for containing liquid therein and
(g) first and second lead connections extending through said joining means from said first and second electrodes, respectively, to the exterior of said stacked arrangement whereby external electrical connections may be made thereto.

2. The composite structure as set forth in claim 1 wherein the electrode spacing is maintained by a porous sheet.

3. The composite structure as set forth in claim 1 wherein the sealed volume contains a liquid having in solution a concentration of at least one positive oxidation state of a metal in the form of metal ions.

4. The composite structure as set forth in claim 1 wherein the sealed volume contains a liquid having concentrations of the same order of magnitude of two different positive ions of the same metal in solution.

5. The composite structure as set forth in claim 1 wherein the sealed volume contains a gel having uniformly dissolved therein a concentration of at least one positive oxidation state of a metal in the form of metal ions.

6. The composite structure as set forth in claim 1 wherein at least a portion of the length of the joining means is made of a self-sealing elastomer.

7. The composite structure as recited in claim 1 wherein at least one of the gas-permeable membranes are porous.

8. The composite structure as recited in claim 1 wherein the first and second electrodes are affixed to the first and second membranes, respectively.

9. The composite structure as recited in claim 1 wherein the first and second electrodes are made of the same metal.

References Cited
UNITED STATES PATENTS

| | | | |
|---|---|---|---|
| 3,396,510 | 8/1968 | Ward et al. | 55—16 |
| 3,486,301 | 12/1969 | Bonnet | 55—158 |

GERALD L. KAPLAN, Primary Examiner

U.S. Cl. X.R.

55—158; 204—DIG 3, 1 R, 195 P, 128, 265, 266, 277, 278